United States Patent
Chen et al.

(10) Patent No.: US 11,121,840 B2
(45) Date of Patent: Sep. 14, 2021

(54) METHOD FOR REPORTING POWER HEADROOM FOR SRS, TERMINAL DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/988,416

(22) Filed: Aug. 7, 2020

(65) Prior Publication Data
US 2020/0374073 A1    Nov. 26, 2020

Related U.S. Application Data

(63) Continuation of application No. PCT/CN2018/078347, filed on Mar. 7, 2018.

(51) Int. Cl.
*H04L 5/00* (2006.01)
*H04W 52/36* (2009.01)
(Continued)

(52) U.S. Cl.
CPC .......... *H04L 5/0048* (2013.01); *H04L 5/0007* (2013.01); *H04W 52/146* (2013.01); *H04W 52/34* (2013.01); *H04W 52/365* (2013.01)

(58) Field of Classification Search
CPC .. H04L 5/0048; H04L 5/0007; H04W 52/146; H04W 52/34; H04W 52/365
(Continued)

(56) References Cited

U.S. PATENT DOCUMENTS

2015/0358920 A1    12/2015    Sorrentino et al.
2017/0302419 A1*   10/2017    Liu ........................ H04L 5/0082
(Continued)

FOREIGN PATENT DOCUMENTS

| CN | 103813430 A | 5/2014 |
|----|-------------|--------|
| CN | 107690157 A | 2/2018 |

(Continued)

OTHER PUBLICATIONS

Huawei et al. "Details on power control for SRS on TDD CCs without PUSCH" 3GPP TSG RAN WG1 Meeting #86, R1-166128, Aug. 26, 2016 (Aug. 26, 2016), pp. 2 and 3, section 3.
(Continued)

*Primary Examiner* — Faisal Choudhury
(74) *Attorney, Agent, or Firm* — Perkins Coie LLP

(57) ABSTRACT

A method for reporting PH for an SRS, terminal device and computer storage medium are provided. The method includes: the terminal device calculates at least one expected SRS transmit power on at least one SRS resource in a target SRS resource set, the target SRS resource set is an SRS resource set on a target BWP; when the terminal device does not transmit an SRS on the target BWP at a moment of calculating the PH, the target SRS resource set is an SRS resource set with a lowest set index on the target BWP; the terminal device obtains the PH of the target SRS resource set through calculation according to the at least one expected SRS transmit power on the at least one SRS resource; and the terminal device reports the PH of the target SRS resource set obtained through calculation.

20 Claims, 2 Drawing Sheets

---

Calculate at least one expected SRS transmit power on at least one SRS resource included in a target SRS resource set — 101

Obtain power headroom PH of the target SRS resource set through calculation according to the at least one expected SRS transmit power on the at least one SRS resource — 102

Report the PH of the target SRS resource set obtained through calculation — 103

(51) Int. Cl.
*H04W 52/14* (2009.01)
*H04W 52/34* (2009.01)

(58) Field of Classification Search
USPC .......................................................... 370/329
See application file for complete search history.

(56) References Cited

U.S. PATENT DOCUMENTS

2019/0074882 A1* 3/2019 Zhou .................. H04W 72/046
2020/0245264 A1* 7/2020 Iwai .................... H04W 52/325

FOREIGN PATENT DOCUMENTS

| CN | 107734622 A | 2/2018 |
|---|---|---|
| RU | 2562612 C1 | 9/2015 |
| WO | 2013051855 A1 | 4/2013 |
| WO | 2013155914 A1 | 10/2013 |
| WO | 2014109707 A1 | 7/2014 |

OTHER PUBLICATIONS

Nokia et al. "UL SRS design considerations in NR" 3GPP TSG RAN WG1 NR Ad-Hoc Meeting, R1-1701106, Jan. 20, 2017 (Jan. 20, 2017), p. 1, section 1.
International Search Report in the international application No. PCT/CN2018/078347, dated Nov. 23, 2018.
NTT Docomo, Inc, "Remaining issues on PHR", 3GPP TSG RAN WG1 Meeting #92, R1-1802492, Athens, Greece, Feb. 26-Mar. 2, 2018.
"3rd Generation Partnership Project; Technical Specification Group Radio Access Network; Evolved Universal Terrestrial Radio Access (E-UTRA); Physical layer procedures (Release 11)", 3GPP TS 36.213 V11.0.0 (Sep. 2012), http://www.3gpp.org.
English translation of the Written Opinion of the International Search Authority in the international application No. PCT/CN2018/078347, dated Nov. 23, 2018.
Ericsson: "PHR format for SUL", 3GPP Draft; R2-1800343 PHR Format for SUL, 3rd Generation Partnership Project (3GPP), Mobile Compeience Centre; 650, Route Des Lucioles; F-06921 Sophia-Antipolis Cedex: France vol. RAN WG2, No. Vancouver, Canada; Jan. 22, 2018-Jan. 26, 2018 Jan. 12, 2018 (Jan. 12, 2018), XP051386140, Retrieved from the Internet: URL: http://www.3gpp. org/ftp/tsg%5Fran/WG2% 5FRL2/TSGR2%5FAHs/2018%5F01 %5FNR/Docs/ [retrieved on Jan. 12, 2018].
ZTE et al.: Summary of remaining issues on UL power control , 3GPP Draft; R1-1721372 Summary of Remaining Issues On UL Power Control Revised. 3rd Generation Partnership Project (3GPP), Mobile Competence Centre; 650, Route Des Lucioles; F-06921 Sophia- Antipolis vol. RAN WG1, No. Reno, USA; Nov. 27, 2017-Dec. 1, 2017 Nov. 27, 2017 (Nov. 27, 2017), XP051363828, Retrieved from the Internet URL: http://www.3gpp.org/ftp/Meetings%5F3GPP 5FSYNC/RAN1/Docs/ [retrieved on Nov. 27, 2017].
Supplementary European Search Report in the European application No. 18908576.4, dated Feb. 10, 2021.
ZTE, "Offline summary for Al 7.1.6.1 NR UL power control in non-CA aspects", 3GPP TSG RAN WG1 Meeting #92, R1-1803356, Feb. 28, 2018.
Samsung, "Summary of NR UL power control-CA aspects", 3GPP TSG RAN WG1 Meeting #92, R1-1803239, Feb. 28, 2018.
First Office Action of the Chinese application No. 202010419440.6, dated Jun. 1, 2021.
Notice of Allowance of the Russian application No. 2020131811, dated Jun. 29, 2021.

* cited by examiner

METHOD FOR REPORTING POWER HEADROOM FOR SRS, TERMINAL DEVICE, AND COMPUTER STORAGE MEDIUM

CROSS-REFERENCE TO RELATED APPLICATIONS

The application is a continuation application of PCT Application No. PCT/CN2018/078347 filed on Mar. 7, 2018, the disclosure of which is incorporated by reference herein in its entity.

RELATED ART

Power headroom (PH) for sounding reference signal (SRS) is a difference between an allowed maximum transmit power of UE and a transmit power of an SRS currently obtained through calculation. In new radio (NR), a terminal device needs to separately perform power headroom report (PHR) for a physical uplink shared channel (PUSCH) and an SRS. The terminal device needs to not only report PH for a carrier that currently transmits the PUSCH or the SRS, but also report PH for a carrier that does not transmit the PUSCH or the SRS, so as to provide reference for scheduling or power control of a network side on the carrier.

If the terminal device transmits an SRS on a particular carrier at a particular moment, corresponding PH may be represented as:

$$PH_{type3,f,c}(i,q_s,l) = P_{CMAX,f,c}(i) - \{P_{O\_SRS,f,c}(q_s) + 10\log_{10}(2^{\mu} \cdot M_{SRS,f,c}(i)) + \alpha_{SRS,f,c}(q_s) \cdot PL_{f,c}(q_s) + h_{f,c}(i,l)\},$$

where $P_{CMAX,f,c}(i)$ is a maximum transmit power of the terminal device, and a calculation result in braces is an expected transmit power obtained by the terminal device through calculation according to an actual SRS transmission parameter on the particular carrier at the particular moment.

If the terminal device does not transmit an SRS on a particular carrier at a particular moment, corresponding PH may be represented as:

$$PH_{type3,f,c}(i,q_s,l) = \tilde{P}_{CMAX,f,c}(i) - \{P_{O\_SRS,f,c}(q_{s0}) + \alpha_{SRS,f,c}(q_{s0}) \cdot PL_{f,c}(q_{s0}) + h_{f,c}(i,l)\},$$

$\tilde{P}_{CMAX,f,c}(i)$ is a maximum transmit power assumed by the terminal device on the particular carrier, and a calculation result in braces is an expected transmit power of the terminal device on the particular carrier (no SRS transmission parameter).

The foregoing PH is separately calculated for each SRS resource set $q_s$, and corresponds to each SRS resource in the SRS resource set. However, a plurality of SRS resources in an SRS resource set may perform transmission on different orthogonal frequency division multiplexing (OFDM) symbols (referred to as time division multiplexing (TDM)), or may perform transmission simultaneously on a same OFDM symbol (referred to as frequency division multiplexing (FDM)). This process may be FDM in one resource subset or TDM between resource subsets. In this case, different PH calculation methods need to be used for the two multiplexing manners, namely, TDM and FDM, so as to obtain a correct PHR. In addition, allowed maximum transmit powers of different antenna array groups (Panel) may be different, and a current PHR does not support separate PH reporting for each antenna array group Panel.

SUMMARY

The present disclosure relates to the field of information processing technologies, and in particular, to a method for reporting power headroom (PH) for a sounding reference signal (SRS), a terminal device, and a computer storage medium.

In a first aspect, a method for reporting PH for an SRS is provided, The method includes the following operations.

A terminal device calculates at least one expected SRS transmit power on at least one SRS resource included in a target SRS resource set, where the target SRS resource set is an SRS resource set on a target bandwidth part (BWP); when the terminal device does not transmit an SRS on the target BWP at a moment of calculating the PH, the target SRS resource set is an SRS resource set with a lowest set index on the target BWP.

The terminal device obtains the PH of the target SRS resource set through calculation according to the at least one expected SRS transmit power on the at least one SRS resource.

The terminal device reports the PH of the target SRS resource set obtained through calculation.

In a second aspect, a terminal device is provided. The terminal device includes a processor and a memory configured to store computer-executable instructions that, when executed by the processor, cause the processor to perform operations of:

calculating at least one expected SRS transmit power on at least one SRS resource included in a target SRS resource set, where the target SRS resource set is an SRS resource set on a target bandwidth part (BWP); when the terminal device does not transmit an SRS on the target BWP at a moment of calculating PH, the target SRS resource set is an SRS resource set with a lowest set index on the target BWP;

obtaining the PH of the target SRS resource set through calculation according to the at least one expected SRS transmit power on the at least one SRS resource; and reporting the PH of the target SRS resource set obtained through calculation.

In a third aspect, a non-transitory computer storage medium is provided. The computer storage medium has stored thereon computer-executable instructions that, when executed by a processor of a terminal device, causes the terminal device to perform a method for reporting PH for an SRS. The method includes the following operations.

The terminal device calculates at least one expected SRS transmit power on at least one SRS resource included in a target SRS resource set, where the target SRS resource set is an SRS resource set on a target bandwidth part (BWP); when the terminal device does not transmit an SRS on the target BWP at a moment of calculating the PH, the target SRS resource set is an SRS resource set with a lowest set index on the target BWP.

The terminal device obtains the PH of the target SRS resource set through calculation according to the at least one expected SRS transmit power on the at least one SRS resource.

The terminal device reports the PH of the target SRS resource set obtained through calculation.

DETAILED DESCRIPTION

To make the features and technical content of the embodiments of the present disclosure more comprehensive, the following describes implementations of the embodiments of the present disclosure in detail with reference to the accompanying drawings. The accompanying drawings are intended only for reference, and not intended to limit the embodiments of the present disclosure.

Embodiment 1

Figure 1:
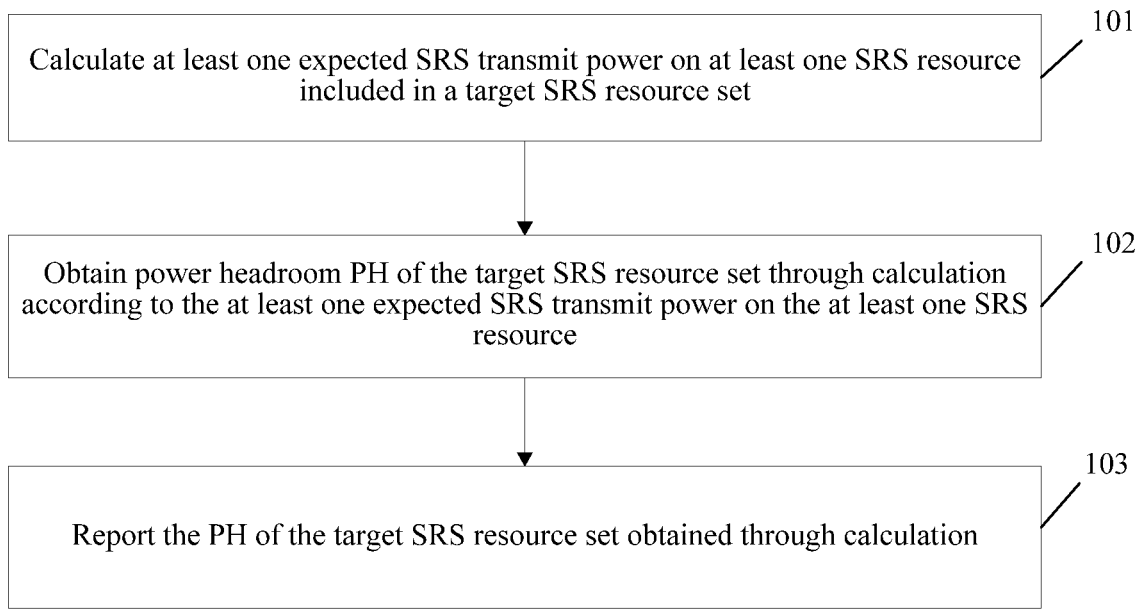
FIG. 1 is a schematic flowchart of a method for reporting power headroom (PH) for a sounding reference signal (SRS) according to an embodiment of the present disclosure.

An embodiment of the present disclosure provides a method for reporting power headroom (PH) for a sounding reference signal (SRS), applied to a terminal device. As shown in FIG. 1, the method includes the following steps:

Step 101: Calculate at least one expected SRS transmit power on at least one SRS resource included in a target SRS resource set, where the target SRS resource set is an SRS resource set on a target carrier or a target bandwidth part BWP.

Step 102: Obtain power headroom PH of the target SRS resource set through calculation according to the at least one expected SRS transmit power on the at least one SRS resource.

Step 103: Report the PH of the target SRS resource set obtained through calculation.

Specifically, in step 101, that at least one expected SRS transmit power on at least one SRS resource included in a target SRS resource set is calculated includes:

if the terminal device transmits an SRS on an SRS resource at a moment of calculating the PH, calculating an expected SRS transmit power on the SRS resource based on a transmission parameter of the transmitted SRS and a power control parameter configured for the SRS resource or the target SRS resource set.

In other words, if the terminal device transmits the SRS on the SRS resource at the moment of calculating the PH, the terminal device calculates the expected SRS transmit power on the SRS resource based on the transmission parameter of the transmitted SRS and the power control parameter configured for the SRS resource or the target SRS resource set in which the SRS resource is located. Herein, the power control parameter may include an open-loop power control parameter and a closed-loop power control parameter.

For example, if the terminal device transmits the SRS on a particular SRS resource at the moment of calculating the PH, the expected SRS transmit power is:

$$P_{exp,f,c}(i,q_s,l) = \{P_{O\_SRS,f,c}(q_s) + 10 \log_{10}(2^{\mu} \cdot M_{SRS,f,c}(i)) + \alpha_{SRS,f,c}(q_s) \cdot PL_{f,c}(q_s) + h_{f,c}(i,l)\},$$

Parameters in the formula are the transmission parameter of the SRS transmitted on the SRS resource and the power control parameter configured for the SRS resource set $q_s$ in which the SRS resource is located, where $M_{SRS,f,c}(i)$ indicates a transmission bandwidth of the SRS, $\mu$ is a subcarrier spacing of SRS transmission, $P_{O\_SRS,f,c}(q_s)$ is a target receive power, $\alpha_{SRS,f,c}(q_s)$ a path loss factor, $PL_{f,c}(q_s)$ is an estimated value of a path loss, and $h_{f,c}(i,l)$ is an SRS closed-loop power adjustment factor.

Specifically, in step 101, that at least one expected SRS transmit power on at least one SRS resource included in a target SRS resource set is calculated further includes:

if the terminal device does not transmit an SRS on an SRS resource at a moment of calculating the PH, calculating an expected SRS transmit power on the SRS resource based on a power control parameter configured for the SRS resource or the target SRS resource set.

In other words, if the terminal device does not transmit the SRS on a particular SRS resource at the moment of calculating the PH, the terminal device calculates the expected SRS transmit power on the SRS resource based on the power control parameter configured for the SRS resource or the target SRS resource set in which the SRS resource is located. Herein, the power control parameter usually includes only an open-loop power control parameter.

For example, if the terminal device does not transmit the SRS on the particular SRS resource at the moment of calculating the PH, the expected SRS transmit power is:

$$P_{exp,f,c}(i,q_s,l) = \{P_{O\_SRS,f,c}(q_{s0}) + \alpha_{SRS,f,c}(q_{s0}) \cdot PL_{f,c}(q_{s0}) + h_{f,c}(i,l)\},$$

A parameter in the formula is the power control parameter configured for the SRS resource set $q_{s0}$ in which the SRS resource is located, where $P_{O\_SRS,f,c}(q_{s0})$ is a target receive power, $\alpha_{SRS,f,c}(q_{s0})$ is a path loss factor, $PL_{f,c}(q_{s0})$ is an estimated value of a path loss, and $h_{f,c}(i,l)$ is an SRS closed-loop power adjustment factor.

The at least one SRS resource is one of the following:

at least one SRS resource occupying a same OFDM symbol in the target SRS resource set;

at least one SRS resource occupying different OFDM symbols in the target SRS resource set;

at least one SRS resource occupying different bandwidths in the target SRS resource set;

at least one SRS resource using different antenna array groups to transmit an SRS in the target SRS resource set; and at least one SRS resource using a same antenna array group to transmit an SRS in the target SRS resource set.

When the target SRS resource set is used for uplink non-codebook transmission, the at least one SRS resource is all SRS resources in the target SRS resource set.

The method includes that when the target SRS resource set is used for uplink codebook transmission, beam management, or antenna switching, the at least one SRS resource is any SRS resource in the target SRS resource set.

Whether the target SRS resource set is used for the uplink non-codebook transmission, the uplink codebook transmission, the beam management, or the antenna switching may be separately configured for each SRS resource set by using higher layer signaling.

When the terminal device transmits an SRS on the target carrier or the target BWP at a moment of calculating the PH, or the target carrier or the target BWP is a currently activated carrier or BWP, the target SRS resource set is an SRS resource set currently used for SRS transmission on the target carrier or the target BWP, or the target SRS resource set is an SRS resource set associated with current PUSCH transmission.

When the terminal device does not transmit an SRS on the target carrier or the target BWP at a moment of calculating the PH, or the target carrier or the target BWP is not an activated carrier or BWP, the target SRS resource set is an SRS resource set with a lowest set index on the target carrier or the target BWP, or the target SRS resource set is an SRS resource set with a lowest set index on a recently activated BWP on the target carrier.

In other words, if the terminal device transmits the SRS on the target carrier or the target BWP at the moment of calculating the PH, or the target carrier or the target BWP is the currently activated carrier or BWP, the target SRS resource set is the SRS resource set currently used for the SRS transmission on the target carrier or the target BWP, or the target SRS resource set is the SRS resource set associated with the current PUSCH transmission.

Specifically, if the current PUSCH transmission is codebook-based PUSCH transmission, the target SRS resource set is an SRS resource set used for codebook transmission. If the current PUSCH transmission is non-codebook-based PUSCH transmission, the target SRS resource set is an SRS resource set used for non-codebook transmission. If the current PUSCH transmission is antenna switching-based PUSCH transmission, the target SRS resource set is an SRS resource set used for the antenna switching.

If the terminal device does not transmit the SRS on the target carrier or the target BWP at the moment of calculating the PH, or the target carrier or the target BWP is not the activated carrier or BWP, the target SRS resource set is the SRS resource set with the minimum set index on the target carrier or the target BWP, or the target SRS resource set is the SRS resource set with the minimum set index on the recently activated BWP on the target carrier.

The SRS resource set with the minimum set index may be an SRS resource set whose SRS resource set ID equals 0 on the target carrier or the target BWP. If a minimum ID in a current SRS resource set is 3 instead of 0, an SRS resource set whose ID is 3 may be selected.

In step 102, that power headroom PH of the target SRS resource set is obtained through calculation according to the at least one expected SRS transmit power on the at least one SRS resource may have the following scenarios:

Scenario 1

A difference between a maximum transmit power and a sum of the at least one expected SRS transmit power on the at least one SRS resource is used as the PH of the target SRS resource set.

In other words, the terminal device uses the difference between the maximum transmit power and a first power as the PH of the target SRS resource set, and the first power herein is the sum of the at least one expected SRS transmit power on the at least one SRS resource.

The maximum transmit power is a maximum transmit power supported by the terminal device, or a maximum transmit power supported by the terminal device on a carrier on which the target SRS resource set is located, or a maximum transmit power supported by the terminal device on an antenna array group that is used to transmit an SRS on the target SRS resource set.

For example, $$PH_{type3,f,e}(i, q_s, l) = P_{CMAX,f,c}(i) - \sum_{k=1}^{K} P_{exp,f,c,k}(i, q_s, l),$$

where $P_{CMAX,f,c}(i)$ is an allowed maximum transmit power of the terminal device on a carrier c, and K is a quantity of the at least one SRS resource.

The at least one SRS resource occupies a same OFDM symbol; or the at least one SRS resource uses a same antenna array group to transmit an SRS.

In other words, the method may be used for a case in which the at least one SRS resource occupies the same OFDM symbol, or a case in which the at least one SRS resource uses the same antenna array group to transmit the SRS. In the former case, power headroom may be accurately calculated by using the method when the terminal device simultaneously transmits a plurality of SRSs. In the latter case, total power headroom on an antenna array group may be accurately calculated by using the method.

If different target SRS resource sets correspond to different antenna array groups (panel), the method can support separate PH reporting for each target SRS resource set according to a respective maximum transmit power of each antenna array group.

Scenario 2

A difference between a maximum transmit power and a maximum or minimum expected transmit power in the at least one expected SRS transmit power on the at least one SRS resource is used as the PH of the target SRS resource set.

In other words, in this scenario, the terminal device uses the difference between the maximum transmit power and a second power as the PH of the target SRS resource set, and the second power herein is the maximum or minimum expected SRS transmit power in the at least one expected SRS transmit power on the at least one SRS resource.

The maximum transmit power is one of the following:

a maximum transmit power supported by the terminal device;

a maximum transmit power supported by the terminal device on a carrier on which the target SRS resource set is located; and a maximum transmit power supported by the terminal device on an antenna array group that is used to transmit an SRS on the target SRS resource set.

For example, $$PH_{type3,f,e}(i, q_s, l) = P_{CMAX,f,c}(i) - \min_{k \in \{1,2,\ldots,K\}} (P_{exp,f,c,k}(i, q_s, l)),$$

where $P_{CMAX,f,c}(i)$ is the maximum transmit power of the terminal device, and K is a quantity of the at least one SRS resource.

If expected SRS transmit powers on all SRS resources in the target SRS resource set are the same, any SRS resource may be used to calculate the PH.

The at least one SRS resource occupies different OFDM symbols; or occupies different bandwidths. In other words, the method may be used for a case in which the at least one SRS resource occupies the different OFDM symbols, or a case in which the at least one SRS resource occupies the different bandwidths. In this case, the terminal device reports PH of only one of the SRS resources, and the terminal device may obtain PH of another SRS resource according to the PH of the only one of the SRS resources.

Different target SRS resource sets correspond to different antenna array groups.

Correspondingly, that the PH of the target SRS resource set obtained through calculation is reported includes:

separately reporting PH of each target SRS resource set according to a maximum transmit power of each antenna array group.

In other words, if the different target SRS resource sets correspond to different panels, the solution provided in this scenario can also support separate PH reporting for each target SRS resource set according to the respective maximum transmit power of each antenna array group.

Scenario 3: A difference between a maximum transmit power on a first SRS resource in the at least one SRS resource and an expected SRS transmit power of the first SRS resource is used as PH of the first SRS resource.

The PH of the first SRS resource is added to the PH of the target SRS resource set.

In this scenario, the terminal device uses the difference between the maximum transmit power on the first SRS resource in the at least one SRS resource and the at least one expected SRS transmit power of the first SRS resource as the PH of the first SRS resource, and the PH of the target SRS resource set includes the PH of the first SRS resource.

The maximum transmit power on the first SRS resource may be a maximum transmit power supported by an antenna array group that is used to transmit an SRS on the first SRS resource. In other words, the maximum transmit power on the first SRS resource is the maximum transmit power supported on the antenna array group that is used to transmit the SRS on the first SRS resource.

In addition, the maximum transmit power on the first SRS resource may alternatively be a maximum transmit power supported by the terminal device or a maximum transmit power supported by the terminal device on a carrier on which the target SRS resource set is located.

The method further includes: separately using each SRS resource in the target SRS resource set as the first SRS resource. To be specific, the PH of each (in other words, each SRS resource in the target SRS resource set is separately used as the first SRS resource) of the at least one SRS resource is calculated, and the PH separately obtained for the at least one SRS resource is used as the PH of the target SRS resource set for PH reporting. Herein, the PH of the target SRS resource set is actually a set including a plurality of PH values (respectively corresponding to different SRS resources).

If the target SRS resource set includes a plurality of SRS resources corresponding to a plurality of panels, the method can support separate PH reporting for SRS resources on different panels.

The method may be used for a case in which the at least one SRS resource uses the different antenna array groups to transmit the SRS.

Based on the foregoing description, step 103 is described below:

That the PH of the target SRS resource set obtained through calculation is reported includes: reporting the PH of the target SRS resource set as PH of an SRS on the target carrier or the target BWP, and skipping reporting PH corresponding to another SRS resource on the target carrier or the target BWP.

That the PH of the target SRS resource set obtained through calculation is reported includes: reporting PH corresponding to each SRS resource set configured on the target carrier or the target BWP.

It can be seen that through the foregoing solution, the PH of the target SRS resource set can be obtained through calculation for the SRS resource in the target SRS resource set on the target carrier or the target bandwidth part, and the PH is reported to a network side, so that the network side can obtain accurate SRS power headroom information, and then perform subsequent SRS scheduling and power control.

In addition, the present disclosure can also support a separate PHR for different panels.

Embodiment 2

Figure 2:
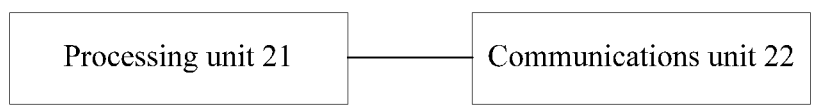
FIG. 2 is a schematic structural diagram of composition of a terminal device according to an embodiment of the present disclosure.

An embodiment of the present disclosure provides a terminal device. As shown in FIG. 2, the terminal device includes:

a processing unit 21, configured to: calculate at least one expected SRS transmit power on at least one SRS resource included in a target SRS resource set, where the target SRS resource set is an SRS resource set on a target carrier or a target bandwidth part BWP; and obtain power headroom PH of the target SRS resource set through calculation according to the at least one expected SRS transmit power on the at least one SRS resource; and a communications unit 22, configured to report the PH of the target SRS resource set obtained through calculation.

Specifically, if the terminal device transmits an SRS on an SRS resource at a moment of calculating the PH, the processing unit 21 calculates an expected SRS transmit power on the SRS resource based on a transmission parameter of the transmitted SRS and a power control parameter configured for the SRS resource or the target SRS resource set.

In other words, if the terminal device transmits the SRS on the SRS resource at the moment of calculating the PH, the terminal device calculates the expected SRS transmit power on the SRS resource based on the transmission parameter of the transmitted SRS and the power control parameter configured for the SRS resource or the target SRS resource set in which the SRS resource is located. Herein, the power control parameter may include an open-loop power control parameter and a closed-loop power control parameter.

For example, if the terminal device transmits the SRS on a particular SRS resource at the moment of calculating the PH, the expected SRS transmit power is:

$$P_{exp,f,c}(i,q_s,l) = \{P_{O\_SRS,f,c}(q_s) + 10\log_{10}(2^\mu \cdot M_{SRS,f,c}(i)) + \alpha_{SRS,f,c}(q_s) \cdot PL_{f,c}(q_s) + h_{f,c}(i,l)\},$$

Parameters in the formula are the transmission parameter of the SRS transmitted on the SRS resource and the power control parameter configured for the SRS resource set $q_s$ in which the SRS resource is located, where $M_{SRS,f,c}(i)$ indicates a transmission bandwidth of the SRS, $\mu$ is a subcarrier spacing of SRS transmission, $P_{O\_SRS,f,c}(q_s)$ is a target receive power, $\alpha_{SRS,f,c}(q_s)$ is a path loss factor, $PL_{f,c}(q_s)$ is an estimated value of a path loss, and $h_{f,c}(i,l)$ is an SRS closed-loop power adjustment factor.

Specifically, if the terminal device does not transmit an SRS on an SRS resource at a moment of calculating the PH, the processing unit 21 calculates an expected SRS transmit power on the SRS resource based on a power control parameter configured for the SRS resource or the target SRS resource set.

In other words, if the terminal device does not transmit the SRS on a particular SRS resource at the moment of calculating the PH, the terminal device calculates the expected SRS transmit power on the SRS resource based on the power control parameter configured for the SRS resource or the target SRS resource set in which the SRS resource is located. Herein, the power control parameter usually includes only an open-loop power control parameter.

For example, if the terminal device does not transmit the SRS on the particular SRS resource at the moment of calculating the PH, the expected SRS transmit power is:

$$P_{exp,f,c}(i,q_s,l) = \{P_{O\_SRS,f,c}(q_{s0}) + \alpha_{SRS,f,c}(q_{s0}) \cdot PL_{f,c}(q_{s0}) + h_{f,c}(i,l)\},$$

A parameter in the formula is the power control parameter configured for the SRS resource set $q_{s0}$ in which the SRS resource is located, where $P_{O\_SRS,f,c}(q_{s0})$ is a target receive power, $\alpha_{SRS,f,c}(q_{s0})$ is a path loss factor, $PL_{f,c}(q_{s0})$ is an estimated value of a path loss, and $h_{f,c}(i,l)$ is an SRS closed-loop power adjustment factor.

The at least one SRS resource is one of the following:
at least one SRS resource occupying a same OFDM symbol in the target SRS resource set;
at least one SRS resource occupying different OFDM symbols in the target SRS resource set;
at least one SRS resource occupying different bandwidths in the target SRS resource set;
at least one SRS resource using different antenna array groups to transmit an SRS in the target SRS resource set; and
at least one SRS resource using a same antenna array group to transmit an SRS in the target SRS resource set.

When the target SRS resource set is used for uplink non-codebook transmission, the at least one SRS resource is all SRS resources in the target SRS resource set.

When the target SRS resource set is used for uplink codebook transmission, beam management, or antenna switching, the at least one SRS resource is any SRS resource in the target SRS resource set. In other words, if the target SRS resource set is used for the uplink codebook transmission, the beam management, or the antenna switching, the at least one SRS resource is any SRS resource in the target SRS resource set.

Whether the target SRS resource set is used for the uplink non-codebook transmission, the uplink codebook transmission, the beam management, or the antenna switching may be separately configured for each SRS resource set by using higher layer signaling.

When the terminal device transmits an SRS on the target carrier or the target BWP at a moment of calculating the PH, or the target carrier or the target BWP is a currently activated carrier or BWP, the target SRS resource set is an SRS resource set currently used for SRS transmission on the target carrier or the target BWP, or the target SRS resource set is an SRS resource set associated with current PUSCH transmission.

When the terminal device does not transmit an SRS on the target carrier or the target BWP at a moment of calculating the PH, or the target carrier or the target BWP is not an activated carrier or BWP, the target SRS resource set is an SRS resource set with a lowest set index on the target carrier or the target BWP, or the target SRS resource set is an SRS resource set with a lowest set index on a recently activated BWP on the target carrier.

In other words, if the terminal device transmits the SRS on the target carrier or the target BWP at the moment of calculating the PH, or the target carrier or the target BWP is the currently activated carrier or BWP, the target SRS resource set is the SRS resource set currently used for the SRS transmission on the target carrier or the target BWP, or the target SRS resource set is the SRS resource set associated with the current PUSCH transmission.

Specifically, if the current PUSCH transmission is codebook-based PUSCH transmission, the target SRS resource set is an SRS resource set used for codebook transmission. If the current PUSCH transmission is non-codebook-based PUSCH transmission, the target SRS resource set is an SRS resource set used for non-codebook transmission. If the current PUSCH transmission is antenna switching-based PUSCH transmission, the target SRS resource set is an SRS resource set used for the antenna switching.

If the terminal device does not transmit the SRS on the target carrier or the target BWP at the moment of calculating the PH, or the target carrier or the target BWP is not an activated carrier or BWP, the target SRS resource set is the SRS resource set with the minimum set index on the target carrier or the target BWP, or the target SRS resource set is the SRS resource set with the minimum set index on the recently activated BWP on the target carrier.

The SRS resource set with the minimum set index may be an SRS resource set whose SRS resource set ID equals 0 on the target carrier or the target BWP. If a minimum ID in a current SRS resource set is 3 instead of 0, an SRS resource set whose ID is 3 may be selected.

That power headroom PH of the target SRS resource set is obtained through calculation according to the at least one expected SRS transmit power on the at least one SRS resource may have the following scenarios:

Scenario 1

The processing unit 21 uses a difference between a maximum transmit power and a sum of the at least one expected SRS transmit power on the at least one SRS resource as the PH of the target SRS resource set.

In other words, the terminal device uses the difference between the maximum transmit power and a first power as the PH of the target SRS resource set, and the first power herein is the sum of the at least one expected SRS transmit power on the at least one SRS resource.

The maximum transmit power is a maximum transmit power supported by the terminal device, or a maximum transmit power supported by the terminal device on a carrier on which the target SRS resource set is located, or a maximum transmit power supported by the terminal device on an antenna array group that is used to transmit an SRS on the target SRS resource set.

For example, $$PH_{type3,f,e}(i, q_s, l) = P_{CMAX,f,c}(i) - \sum_{k=1}^{K} P_{exp,f,c,k}(i, q_s, l),$$

where $P_{CMAX,f,c}(i)$ is an allowed maximum transmit power of the terminal device on a carrier c, and K is a quantity of the at least one SRS resource.

The at least one SRS resource occupies a same OFDM symbol; or the at least one SRS resource uses a same antenna array group to transmit an SRS.

In other words, the foregoing processing may be used for a case in which the at least one SRS resource occupies the same OFDM symbol, or a case in which the at least one SRS resource uses the same antenna array group to transmit the SRS. In the former case, power headroom may be accurately calculated through the foregoing processing when the terminal device simultaneously transmits a plurality of SRS resources. In the latter case, total power headroom on an antenna array group may be accurately calculated through the foregoing processing.

If different target SRS resource sets correspond to different antenna array groups (panel), the foregoing processing can support separate PH reporting for each target SRS resource set according to a respective maximum transmit power of each antenna array group.

Scenario 2

The processing unit 21 uses a difference between a maximum transmit power and a maximum or minimum expected transmit power in the at least one expected SRS transmit power on the at least one SRS resource as the PH of the target SRS resource set.

In other words, in this scenario, the terminal device uses the difference between the maximum transmit power and a second power as the PH of the target SRS resource set, and the second power herein is the maximum or minimum expected SRS transmit power in the at least one expected SRS transmit power on the at least one SRS resource.

The maximum transmit power is one of the following:

a maximum transmit power supported by the terminal device;

a maximum transmit power supported by the terminal device on a carrier on which the target SRS resource set is located; and a maximum transmit power supported by the terminal device on an antenna array group that is used to transmit an SRS on the target SRS resource set.

For example, $$PH_{type3,f,c}(i, q_s, l) = P_{CMAX,f,c}(i) - \min_{k \in \{1,2,\ldots,K\}} (P_{exp,f,c,k}(i, q_s, l)),$$

where $P_{CMAX,f,c}(i)$ is the maximum transmit power of the terminal device, and K is a quantity of the at least one SRS resource.

If expected SRS transmit powers on all SRS resources in the target SRS resource set are the same, any SRS resource may be used to calculate the PH.

The at least one SRS resource occupies different OFDM symbols; or occupies different bandwidths. In other words, the foregoing processing may be used for a case in which the at least one SRS resource occupies the different OFDM symbols, or a case in which the at least one SRS resource occupies the different bandwidths. In this case, the terminal device reports PH of only one of the SRS resources, and the terminal device may obtain PH of another SRS resource according to the PH of the only one of the SRS resources.

Different target SRS resource sets correspond to different antenna array groups.

Correspondingly, that the PH of the target SRS resource set obtained through calculation is reported includes:

separately reporting PH of each target SRS resource set according to a maximum transmit power of each antenna array group.

In other words, if the different target SRS resource sets correspond to different panels, the solution provided in this scenario can also support separate PH reporting for each target SRS resource set according to the respective maximum transmit power of each antenna array group.

Scenario 3: The processing unit 21 uses a difference between a maximum transmit power on a first SRS resource in the at least one SRS resource and an expected SRS transmit power of the first SRS resource as PH of the first SRS resource; and adds the PH of the first SRS resource to the PH of the target SRS resource set.

In this scenario, the terminal device uses the difference between the maximum transmit power on the first SRS resource in the at least one SRS resource and the at least one expected SRS transmit power of the first SRS resource as the PH of the first SRS resource, and the PH of the target SRS resource set includes the PH of the first SRS resource.

The maximum transmit power on the first SRS resource may be a maximum transmit power supported by an antenna array group that is used to transmit an SRS on the first SRS resource. In other words, the maximum transmit power on the first SRS resource is the maximum transmit power supported on the antenna array group that is used to transmit the SRS on the first SRS resource.

In addition, the maximum transmit power on the first SRS resource may alternatively be a maximum transmit power supported by the terminal device or a maximum transmit power supported by the terminal device on a carrier on which the target SRS resource set is located.

The processing unit 21 separately uses each SRS resource in the target SRS resource set as the first SRS resource. To be specific, the PH of each (in other words, each SRS resource in the target SRS resource set is separately used as the first SRS resource) of the at least one SRS resource is calculated, and the PH separately obtained for the at least one SRS resource is used as the PH of the target SRS resource set for PH reporting. Herein, the PH of the target SRS resource set is actually a set including a plurality of PH values (respectively corresponding to different SRS resources).

If the target SRS resource set includes a plurality of SRS resources corresponding to a plurality of panels, the foregoing processing can support separate PH reporting for SRS resources on different panels.

The foregoing processing may be used for a case in which the at least one SRS resource uses the different antenna array groups to transmit the SRS.

Based on the foregoing description, a reporting processing manner is described below:

The communications unit 22 reports the PH of the target SRS resource set as PH of an SRS on the target carrier or the target BWP, and skips reporting PH corresponding to another SRS resource on the target carrier or the target BWP.

That the PH of the target SRS resource set obtained through calculation is reported includes: reporting PH corresponding to each SRS resource set configured on the target carrier or the target BWP.

It can be seen that through the foregoing solution, the PH of the target SRS resource set can be obtained through calculation for the SRS resource in the target SRS resource set on the target carrier or the target bandwidth part, and the PH is reported to a network side, so that the network side can obtain accurate SRS power headroom information, and then perform subsequent SRS scheduling and power control.

In addition, the present disclosure can also support a separate PHR for different panels.

Figure 3:
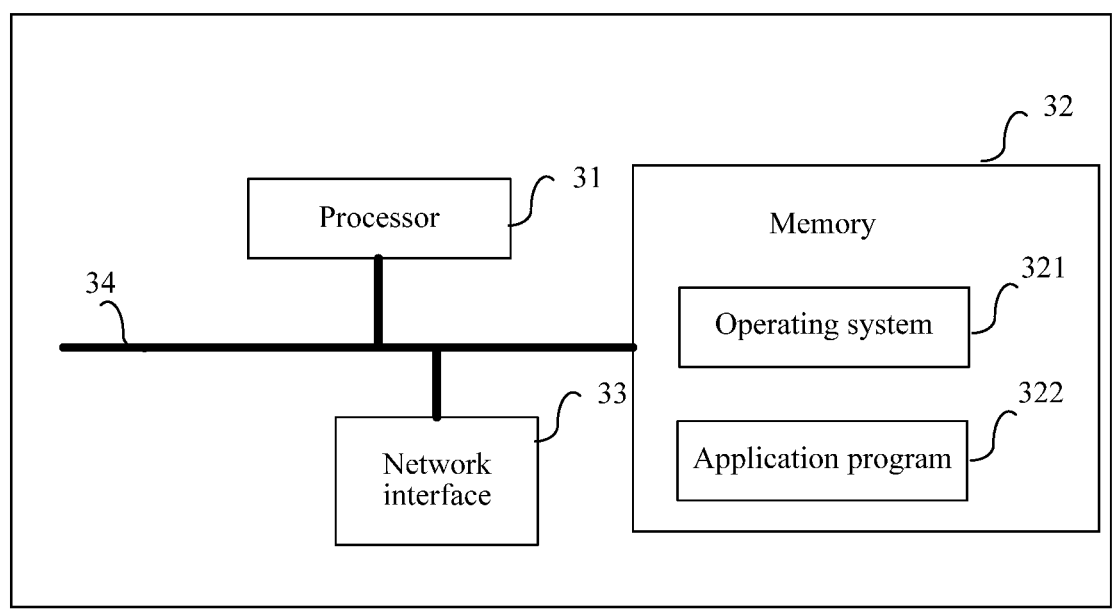
FIG. 3 is a schematic diagram of a hardware architecture according to an embodiment of the present disclosure.

An embodiment of the present disclosure further provides a hardware composition architecture of a terminal device, as shown in FIG. 3, including at least one processor 31, a memory 32, and at least one network interface 33. All the components are coupled together by using a bus system 34. It may be understood that the bus system 34 is configured to implement connection and communication between the components. The bus system 34 further includes a power supply bus, a control bus, and a status signal bus in addition to a data bus. However, for clear description, all buses are marked as the bus system 34 in FIG. 3.

It may be understood that the memory 32 in this embodiment of the present disclosure may be a volatile memory or a nonvolatile memory, or may include both a volatile memory and a nonvolatile memory.

In some implementations, the memory 32 stores the following elements: an executable module or a data structure, or a subset thereof, or an extension set thereof:

an operating system 321 and an application program 322.

The processor 31 is configured to be capable of processing steps of the method in Embodiment 1, and details are not described herein again.

An embodiment of the present disclosure provides a computer storage medium, where the computer storage medium stores a computer-executable instruction, and when being executed, the computer-executable instruction performs steps of the method in Embodiment 1.

When the foregoing apparatus in this embodiment of the present disclosure is implemented in a form of a software functional module and sold or used as an independent product, the foregoing apparatus may alternatively be stored in a computer-readable storage medium. Based on such an understanding, the technical solutions in the embodiments of the present disclosure essentially, or a part contributing to the prior art may be implemented in a form of a software product. The computer software product is stored in a storage medium, and includes several instructions for instructing a computer device (which may be a personal computer, a server, a network device, or the like) to perform all or a part of the method in the embodiments of the present disclosure. The foregoing storage medium includes: any medium that can store program code, such as a USB flash drive, a removable hard disk, a read-only memory (ROM), a magnetic disk, or an optical disc. In this way, the embodiments of the present disclosure are not limited to any specific combination of hardware and software.

Correspondingly, an embodiment of the present disclosure further provides a computer storage medium storing a computer program, and the computer program is configured to perform the method for reporting the power headroom (PH) for the sounding reference signal (SRS) in the embodiments of the present disclosure.

Although the embodiments of the present disclosure have been disclosed for purpose of illustration, a person skilled in the art shall realize that various improvements, additions, and substitutions are also possible. Therefore, the scope of the present disclosure should not be limited to the foregoing embodiments.

What is claimed is:

1. A method for reporting power headroom (PH) for a sounding reference signal (SRS), the method comprising:
    calculating, by a terminal device, at least one expected SRS transmit power on at least one SRS resource comprised in a target SRS resource set, wherein the target SRS resource set is an SR.S resource set on a target bandwidth part (BWP) and the at least one SRS resource comprised in the target SRS resource set comprises multiple SRS resources; when the terminal device does not, transmit an SRS on the target BWP at a moment of calculating the PH, the target SRS resource set is an SRS resource set with a minimum set index among multiple SRS resource sets on the target BWP;
    obtaining, by the terminal device, the PH of the target SRS resource set through calculation according to the at least one expected SRS transmit power on the at least one SRS resource; and
    reporting, by the terminal device, the PH of the target SRS resource set obtained through calculation.

2. The method according to claim I, wherein the calculating, by the terminal device, at least one expected SRS transmit power on at least one SRS resource comprised in a target SRS resource set comprises:
    if the terminal device transmits an SRS on an SRS resource at a moment of calculating the PH, calculating, by the terminal device, an expected. SRS transmit power on the SRS resource based on a transmission parameter of the transmitted SRS and a power control parameter configured for the SRS resource or the target SRS resource set.

3. The method according to claim I, wherein the calculating, by the terminal device, at least one expected SRS transmit power on at least one SRS resource comprised in a target SRS resource set comprises:
    if the terminal device does not transmit an SRS on an SRS resource at a moment of calculating the PH, calculating, by the terminal device, an expected SRS transmit power on the SRS resource based on a power control parameter configured for the SRS resource or the target SRS resource set.

4. The method according to claim 1, wherein the at least one SRS resource is one of the following:
    at least one SRS resource occupying a same orthogonal frequency division multiplexing (OFDM) symbol in the target SRS resource set;
    at least one SRS resource occupying different OFDM symbols in the target SRS resource set;
    at least one SRS resource occupying different bandwidths in the target SRS resource set;
    at least one SRS resource using different antenna array groups to transmit an SRS in the target SRS resource set; and
    at least one SRS resource using a same antenna array group to transmit an SRS in the target SRS resource set.

5. The method according to claim 1, wherein:
    when the target SRS resource set is used for uplink non-codebook transmission, the at least one SRS resource is all SRS resources in the target SRS resource set.

6. The method according to claim 1, wherein:
    when the target SRS resource set is used for uplink codebook transmission, beam management, or antenna switching, the at least one SRS resource is any SRS resource in the target SRS resource set.

7. The method according to claim 1, wherein:
    when the terminal device transmits an SRS on the target BWP at a moment of calculating the PH, or the target BWP is a currently activated BWP, the target SRS resource set is an SRS resource set currently used for SRS transmission on the target BMP, or the target SRS resource set is an SRS resource set associated with current physical uplink shared channel (PUSCH) transmission.

8. The method according to claim 1, wherein the obtaining, by the terminal device, the PH of the target SRS resource set through calculation according to the at least one expected SRS transmit power on the at least one SRS resource comprises:
    using, by the terminal device, a difference between a maximum transmit power and a sum of the at least one expected SRS transmit power on the at least one SRS resource as the PH of the target SRS resource set.

9. The method according to claim 8, wherein:
    the at least one SRS resource occupies a same orthogonal frequency division multiplexing (OFDM) symbol; or
    the at least one SRS resource uses a same antenna array group to transmit an SRS.

10. A terminal device, comprising: a processor and a memory configured to store computer-executable instructions that, when executed by the processor, cause the processor to perform operations of:
    calculating at least one expected sounding reference signal (SRS) transmit power on at least one SRS resource comprised in a target SRS resource set, wherein the target SRS resource set is an SRS resource set on a target bandwidth part (BWP) and the at least one SRS resource comprised in the target SRS resource set comprises multiple SRS resources; when the terminal device does not transmit an SRS on the target BWP at a moment of calculating power headroom (PH), the target SRS resource set is an SRS resource set with a minimum set index among multiple SRS resource sets on the target BWP;

obtaining the PH of the target SRS resource set through calculation according to the at least one expected SRS transmit power on the at least one SRS resource; and reporting the PH of the target SRS resource set obtained through calculation.

11. The terminal device according to claim 10, wherein if the terminal device transmits an SRS on an SRS resource at a moment of calculating the PH, the processor is configure to calculate an expected. SRS transmit power on the SRS resource based on a transmission parameter of the transmitted SRS and a power control parameter configured for the SRS resource or the target SRS resource set.

12. The terminal device according to claim 10, wherein if the terminal device does not transmit an SRS on an SRS resource at a moment of calculating the PH, the processor is configured to calculate an expected SRS transmit power on the SRS resource based on a power control parameter configured for the SRS resource or the target SRS resource set.

13. The terminal device according to claim 10, wherein the at least one SRS resource is one of the following:

at least one SR.S resource occupying a same orthogonal frequency division multiplexing (OFDM) symbol in the target SRS resource set;

at least one SRS resource occupying different OFDM symbols in the target SRS resource set;

at least one SRS resource occupying different bandwidths in the target SRS resource set;

at least one SRS resource using different antenna array groups to transmit an SRS in the target SRS resource set; and at least one SRS resource using a same antenna array group to transmit an SRS in the target SRS resource set.

14. The terminal device according to claim 10, wherein when the target SRS resource set is used for uplink non-codebook transmission, the at least one SRS resource is all SRS resources in the target SRS resource set.

15. The terminal device according to claim 10, wherein when the target SRS resource set is used for uplink codebook transmission, beam management, or antenna switching, the at least one SRS resource is any SRS resource in the target SRS resource set.

16. The terminal device according to claim 10, wherein when the terminal device transmits an SRS on the target BWP at a moment of calculating the PH, or the target BWP is a currently activated BWP, the target SRS resource set is an SRS resource set currently used for SRS transmission on the target BWP, or the target SRS resource set is an SRS resource set associated with current physical uplink shared channel (PUSCH) transmission.

17. The terminal device according to claim 10, wherein the processor is configured to use a difference between a maximum transmit power and a sum of the at least one expected SRS transmit power on the at least one SRS resource as the PH of the target SRS resource set.

18. The terminal device according to claim 17, wherein:

the at least one SRS resource occupies a same orthogonal frequency division multiplexing (OFDM) symbol; or the at least one SRS resource uses a same antenna array group to transmit an SRS.

19. A non-transitory computer storage medium, having stored thereon computer-executable instructions, that when executed by a processor of a terminal device, cause the terminal device to perform a method for reporting power headroom (PH) for a sounding reference signal (SRS), the method comprising:

calculating, by the terminal device, at least one expected SRS transmit power on at least one SRS resource comprised in a target SRS resource set, wherein the target SRS resource set is an SRS resource set on a target bandwidth part (BWP) and the at least one SRS resource comprised in the target SRS resource set comprises multiple SRS resources; when the terminal device does not transmit an SRS on the target BWP at a moment of calculating the PH, the target SRS resource set is an SRS resource set with a minimum set index among multiple SRS resource sets on the target BWP;

obtaining, by the terminal device, the PH of the target SRS resource set through calculation according to the at least one expected SRS transmit power on the at least one SRS resource; and reporting, by the terminal device, the PH of the target SRS resource set obtained through calculation.

20. The non-transitory computer storage medium according to claim 19, wherein the calculating, by the terminal device, at least one expected SRS transmit power on at least one SRS resource comprised in a target SRS resource set comprises:

if the terminal device transmits an SRS on an SRS resource at a moment of calculating the PH, calculating, by the terminal device, an expected SRS transmit power on the SRS resource based on a transmission parameter of the transmitted SRS and a power control parameter configured for the SRS resource or the target SRS resource set.

* * * * *